United States Patent [19]

Stefanutti

[11] Patent Number: 4,787,483
[45] Date of Patent: Nov. 29, 1988

[54] SLOTTED BRAKE BAND FOR TRANSMISSION ASSEMBLY

[75] Inventor: Oscar E. Stefanutti, West Bloomfield, Mich.

[73] Assignee: Advanced Friction Materials Co., Sterling Heights, Mich.

[21] Appl. No.: 354,590

[22] Filed: Mar. 4, 1982

[51] Int. Cl.$^4$ ............................................. F16D 65/06
[52] U.S. Cl. ................................. 188/77 W; 188/249; 188/77 R
[58] Field of Search ................. 188/77 W, 77 R, 249, 188/259, 250 H, 250 E, 250 G, 250 B, 250 A; 192/80

[56]  References Cited

U.S. PATENT DOCUMENTS

| | | | |
|---|---|---|---|
| 774,448 | 11/1904 | Norris | 188/77 W |
| 1,488,891 | 4/1924 | Oetinger | 188/249 |
| 1,514,895 | 11/1924 | Cline | 188/249 |
| 1,568,043 | 1/1926 | Anderson | 188/259 |
| 2,637,420 | 5/1953 | Churchill | 188/77 X |
| 2,690,239 | 9/1954 | Candee | 188/77 W |
| 3,732,954 | 5/1973 | Heid | 192/80 X |

Primary Examiner—John W. Caldwell, Sr.
Assistant Examiner—Alvin Oberley
Attorney, Agent, or Firm—Reising, Ethington, Barnard, Perry & Milton

[57]  ABSTRACT

A transmission band assembly including a circular band member 12 with connector members 14 and 16 disposed on the exterior of the ends of the band member, a friction lining 22 that is bonded to the interior surface of the band member 12, a first pair of spaced slot 24 that extend from one end of the band member 12 over approximately one half the length of the band member, and a second pair of slots 26 that are aligned with the first pair of slots 24 and that extend over the remaining length of the band member. A hole 28 extends therefor through the band member 12 and the lining 22 between the slots 24 and 26.

5 Claims, 1 Drawing Sheet

U.S. Patent       Nov. 29, 1988       4,787,483 ary, and it is to be understood that the terminology
SLOTTED BRAKE BAND FOR TRANSMISSION ASSEMBLY

TECHNICAL FIELD

The subject invention relates to a band of the type which may be utilized in a transmission assembly by being disposed around a drum to control movement within the transmission as the circumference of the band is changed by actuating pins engaging connector members at the ends of the band.

BACKGROUND ART

Bands are commonly used in transmissions to act as a brake or clutch. A variety of band designs have been developed to maximize the surface contact of the band to the uneven surfaces defined by the drum about which the band is disposed and which it frictionally engages or to maximize such contact in the event the band is askew or cocked relative to the drum surface. One such band, as disclosed in the U.S. Pat. No. 2,637,420 to Churchill, is bifurcated to provide a single slot that divides the band substantially along its entire length. The inner face of the band is lined wtih a friction material. The band has tie bars or brackets affixed to the band ends. The band strips while joined at the band ends grip better than an undivided band, and also allow oil to flow through the slot and into the cavity defined by the housing box. However, it has been discovered that in accordance with this invention a very effective wide band can be provided with two pair of aligned slots, and a whole located between the spaced ends of the slots, i.e., the band, is more integrally divided by the multiple slots as opposed to only one slot, and the hole facilitates alignment of the lining to the band. An alternative embodiment of the present invention incorporates said hole with two slots alone. Consequently, the band of this invention distributes the load better than previous bands.

STATEMENT OF INVENTION AND ADVANTAGES

The improved band assembly of the present invention includes a band member extending in a circular configuration between ends thereof with connector members disposed at the ends of the band member on the exterior thereof. The interior surface of the band has a friction lining disposed thereon. The assembly is characterized by a first pair of spaced slots extending from one of the ends for a portion of the length of the band member and the lining, and a second pair of slots having ends spaced from the first pair of slots and extending therefrom over the remaining portion of the length of the band member and the lining to the other end thereof.

The advantage of this assembly is that the slots are efficiently formed in an integral band or single unit. Thus, there is no problem of misalignment of each individual band with respect to the connector member.

FIGURES OF THE DRAWINGS

Other advantages of the present invention will be readily appreciated as the same becomes better understood by reference to the following detailed description when considered in connection with the accompanying drawings wherein.

DETAILED DESCRIPTION OF THE DRAWINGS

Figure 1:
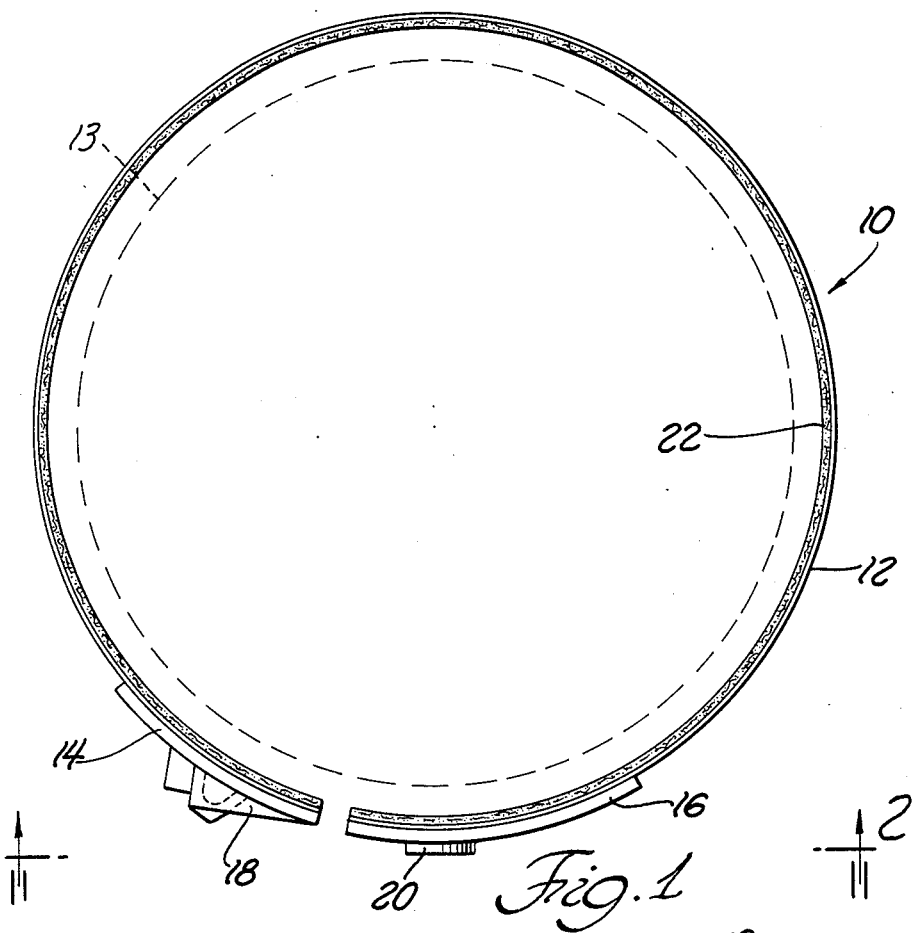
FIG. 1 is a side-elevational view of a brake band of the subject invention.

Referring now with particularity to the drawings, a band assembly constructed in accordance with the subject invention is generally shown at 10. A band member 12 is arranged in a circular configuration to wrap around a drum-like housing schematically shown at 13 of a transmission. Connector members 14 and 16 are welded, brazed or otherwise bonded to the ends of band member 12, and are clamped or pinched towards each other by plungers or pins that contact the projecting abutments ribs 18 and 20 provided on the connector members. In other words, to wrap the band member 12 into frictional engagement about the drum, the connector members 14 and 16 are forced towards each other to close the loop defined by the band 12, i.e., decrease the circumferential length of the band. A friction lining material 22 is bonded (as by an adhesive) to the interior or inner curvilinear surface of the band member 12 to minimize chafing of the drum and band metal surfaces.

Figure 2:
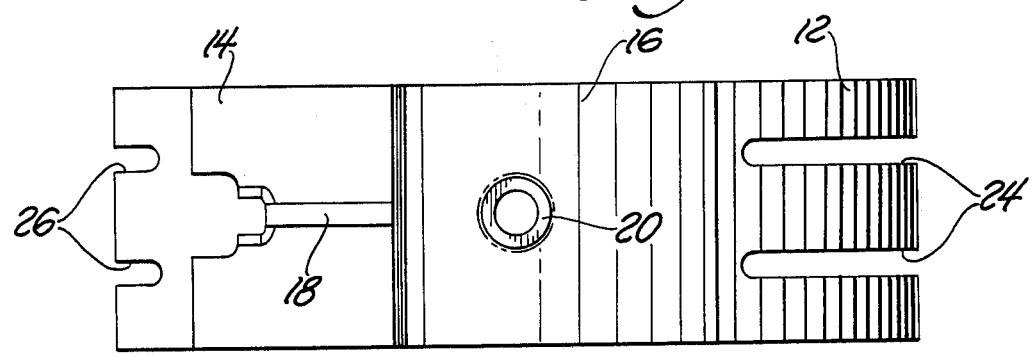
FIG. 2 is a view taken substantially along the line 2—2 of FIG. 1.
Figure 3:
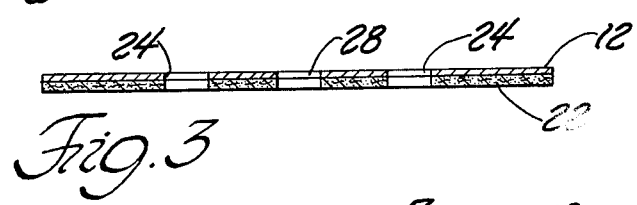
FIG. 3 is an enlarged fragmentary cross-sectional view taken substantially along the line 3—3 of FIG. 4.
Figure 4:
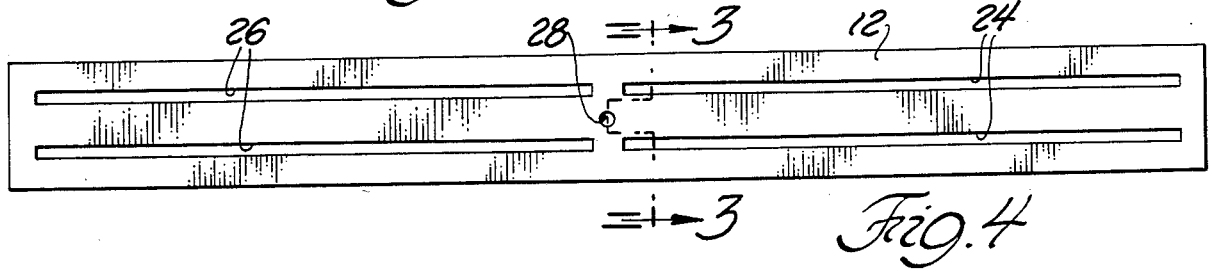
FIG. 4 is a view of a band of the subject invention in an unwound form.

As best illustrated in FIGS. 2, 3 and 4, a first pair of slots 24 originate from but do not contact the ends of the band member 12, and extend towards a second pair of slots 26, but terminate prior to contacting opposing slots 26. As shown in FIG. 3, the slots 24 and 26 pierce or extend through both the band 12 and the lining material 22. Thus, a first pair of spaced slots 24 extend from one end (the connector member 16 end) of the band 12 for a portion of the length of the band member 12 and the lining 22. And a second pair of slots 26, having ends spaced from the first pair of slots 24, extend therefrom over the remaining portion of the length of the band member 12 and the lining 22 to the other end of the band (the connector member 14 end). The first pair of slots 24 are aligned longitudinally of the band member 12 with the second pair of slots 26.

In addition, a hole 28 extends through both the band member 12 and the lining material 22 in the area between the spaced ends of the first 24 and second 26 pairs of slots. The hole 28 is used to locate the lining material 22 exactly in position on the band member 12.

The slots 24 are equal in length to each other and to the slots 26 at the opposite end of the band member 12 as shown in FIG. 4. The slots 24 and 26 also originate or terminate adjacent to, but not in contact with, the connector members 14 and 16. In other words, the outer ends of the slots 24 and 26 are spaced from the ends of the band member 12 and also from the respective connector members 14 and 16.

An alternative embodiment of the present invention consists of two longitudinally aligned and spaced slots 24 and 26. This alternative form of the subject concept includes the several characteristics of the main form of the invention described above, i.e., the slots extend from but do not contact the ends of the band member, are equal in length and are aligned longitudinally, and include a hole in the apex between the spaced ends of said slots.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

The embodiments of the invention in which an exclusive property or privilege is claimed are defined as follows:

1. A band assembly (10) adapted for wrapping about a portion of the peripheral surface of a drum, said band assembly comprising; a band member (12) extending in a circular configuration between ends thereof, connector members (14 and 16) disposed at said ends of said band (12) on the exterior thereof, a friction lining (22) disposed on the interior of said band (12), characterized by a first pair of spaced slots (24) extending from one of said ends for a portion of the length of said band member (12) and said lining (22), and a second pair of slots (26) having ends spaced from said first pair of slots (24) and extending therefrom over the remaining portion of the length of said band member (12) and said lining (22) to the other end thereof, said slots extending through said lining (22) as well as said band member (12).

2. An assembly as set forth in claim 1 wherein said first pair of slots (24) are aligned longitudinally of said band member (12) with said second pair of slots (26).

3. An assembly as set forth in claim 2 including a hole (28) extending through said band member (12) and said lining (22) in the area between the spaced ends of said first and second pairs of slots (24 and 26).

4. An assembly as set forth in claim 2 wherein said first pair of slots (24) are equal in length to each other and to said second pair of slots (26).

5. An assembly as set forth in claim 4 wherein said outer ends of said slots (24, 26) adjacent the ends of said band member (12) are spaced from said connector members (24, 16).

* * * * *